(12) United States Patent
Morenstein et al.

(10) Patent No.: US 12,004,683 B2
(45) Date of Patent: Jun. 11, 2024

(54) COOKWARE FOR USE IN A MICROWAVE OVEN

(71) Applicant: Meyer Intellectual Properties Limited, Kowloon (HK)

(72) Inventors: Joshua Morenstein, San Francisco, CA (US); Christopher Hibmacronan, Oakland, CA (US); Christian Scott Ross, San Francisco, CA (US); Myungjae Park, San Francisco, CA (US); Stanley Kin Sui Cheng, Hillsborough, CA (US); Stephanie Hai Yan Chen, San Francisco, CA (US); Xi Zheng, Fremont, CA (US)

(73) Assignee: Meyer Intellectual Properties Limited (VG)

( * ) Notice: Subject to any disclaimer, the term of this patent is extended or adjusted under 35 U.S.C. 154(b) by 43 days.

(21) Appl. No.: 17/534,580

(22) Filed: Nov. 24, 2021

(65) Prior Publication Data
US 2022/0160167 A1    May 26, 2022

Related U.S. Application Data

(60) Provisional application No. 63/118,338, filed on Nov. 25, 2020.

(51) Int. Cl.
*A47J 36/02* (2006.01)
*A47J 36/06* (2006.01)
*A47J 36/38* (2006.01)

(52) U.S. Cl.
CPC ............. *A47J 36/027* (2013.01); *A47J 36/06* (2013.01); *A47J 36/38* (2013.01)

(58) Field of Classification Search
CPC .......... A47J 36/027; A47J 36/06; A47J 36/38; B65D 81/3453; B65D 81/3446; B65D 81/3438; B65D 81/343
See application file for complete search history.

(56) References Cited

U.S. PATENT DOCUMENTS 6,175,105 B1    1/2001 Rubbright et al.
D693,182 S  *  11/2013 Katterheinrich ............... D7/587
(Continued)

FOREIGN PATENT DOCUMENTS

CN     200988638 Y     12/2007
CN     201929552 U  *  8/2011
(Continued)

OTHER PUBLICATIONS

Office Action issued Dec. 19, 2022 in connection with corresponding Taiwan Patent Application No. 110143976.
(Continued)

*Primary Examiner* — Javier A Pagan
(74) *Attorney, Agent, or Firm* — Akerman LLP

(57) ABSTRACT

According to one example, an article of cookware includes a substantially horizontal bottom having an interior surface and an opposing exterior surface, and a sidewall extending upward from the bottom to terminate at a rim. The bottom, the sidewall, and the rim define an interior volume for one or more food items. The sidewall has an inverted frusto-conical shape with an upper portion, and a lower portion positioned below the upper portion. The upper portion has an outward tilt of less than about 10 degrees from a vertical line. The lower portion has an outward tilt that is at least about 15 degrees greater than the outward tilt of the upper portion.

20 Claims, 12 Drawing Sheets

(56) References Cited

U.S. PATENT DOCUMENTS

| | | | |
|---|---|---|---|
| D697,759 S | | 1/2014 | Katterheinrich et al. |
| D709,317 S | | 7/2014 | Cheng |
| 2013/0047559 A1 | * | 2/2013 | Minnette ................. B29C 65/18 |
| | | | 53/488 |
| 2021/0068584 A1 | * | 3/2021 | Cheng ................... A47J 36/027 |

FOREIGN PATENT DOCUMENTS

| | | |
|---|---|---|
| CN | 201929552 U | 8/2011 |
| CN | 106473590 A | 3/2017 |
| JP | 2016150780 A | 8/2016 |
| TW | 201945253 A | 12/2019 |

OTHER PUBLICATIONS

International Search Report issued Feb. 2, 2022 in connection with PCT/US2021/060711.

Written Opinion issued Feb. 2, 2022 in connection with PCT/US2021/060711.

https://web.archive.org/web/20210316220519/https://cookanyday.com, Meyer Corporation, Mar. 16, 2021, see set of four microwave dishes with tops and handles.

* cited by examiner

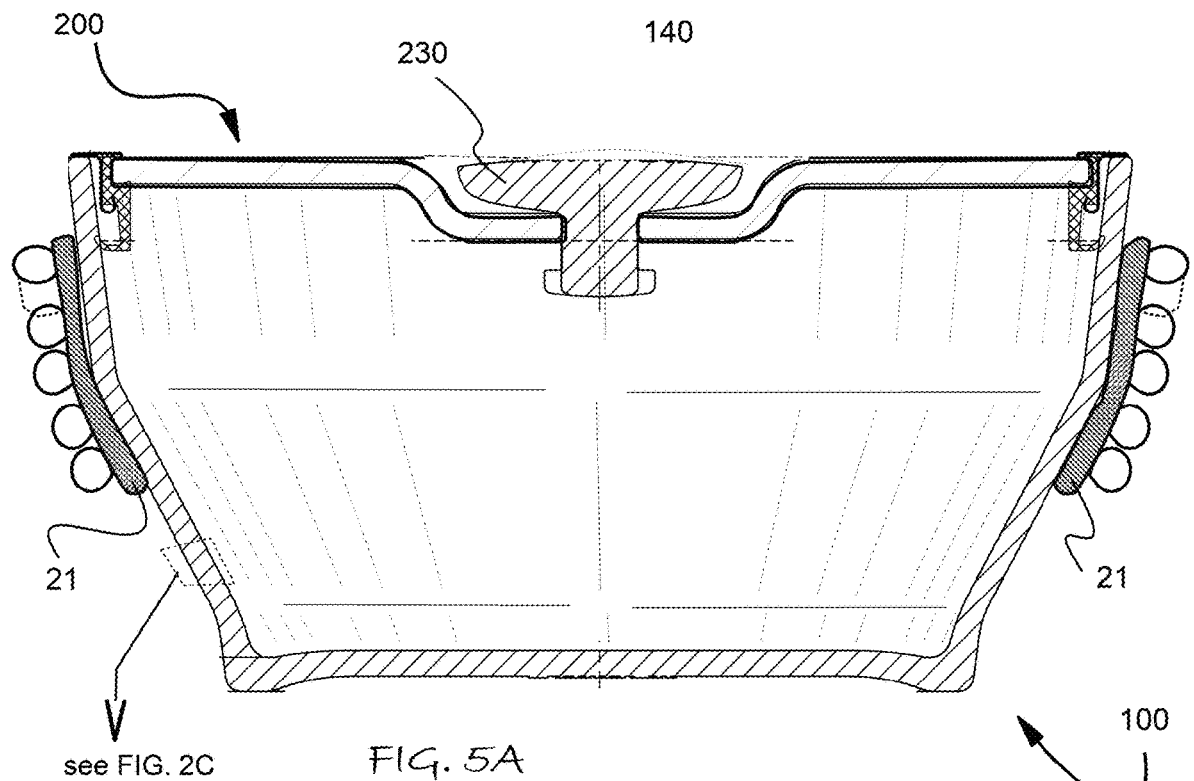
FIG. 5A
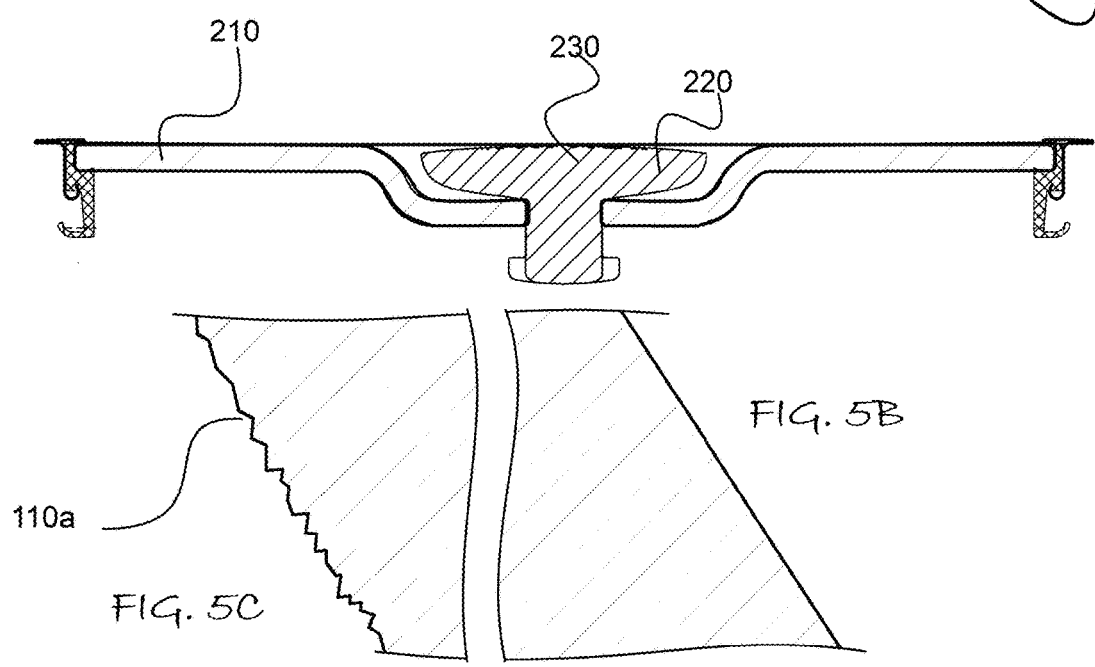
FIG. 5B
FIG. 5C

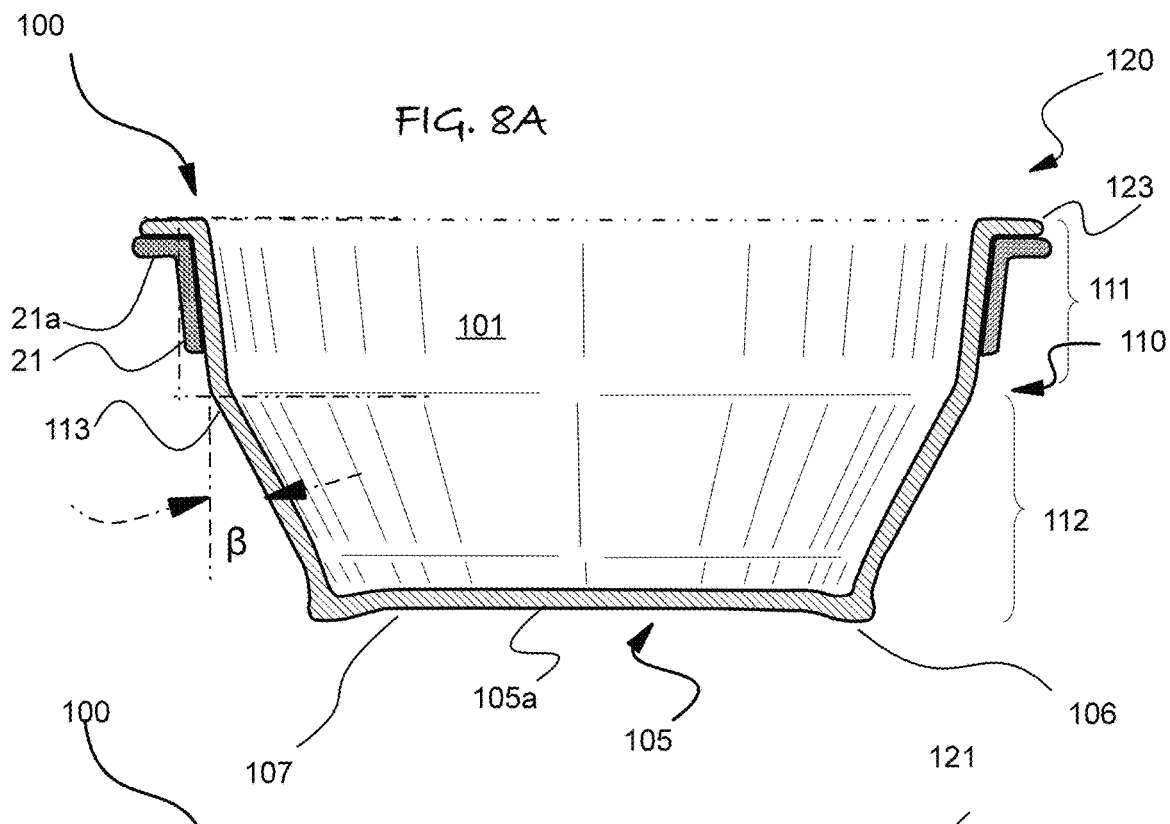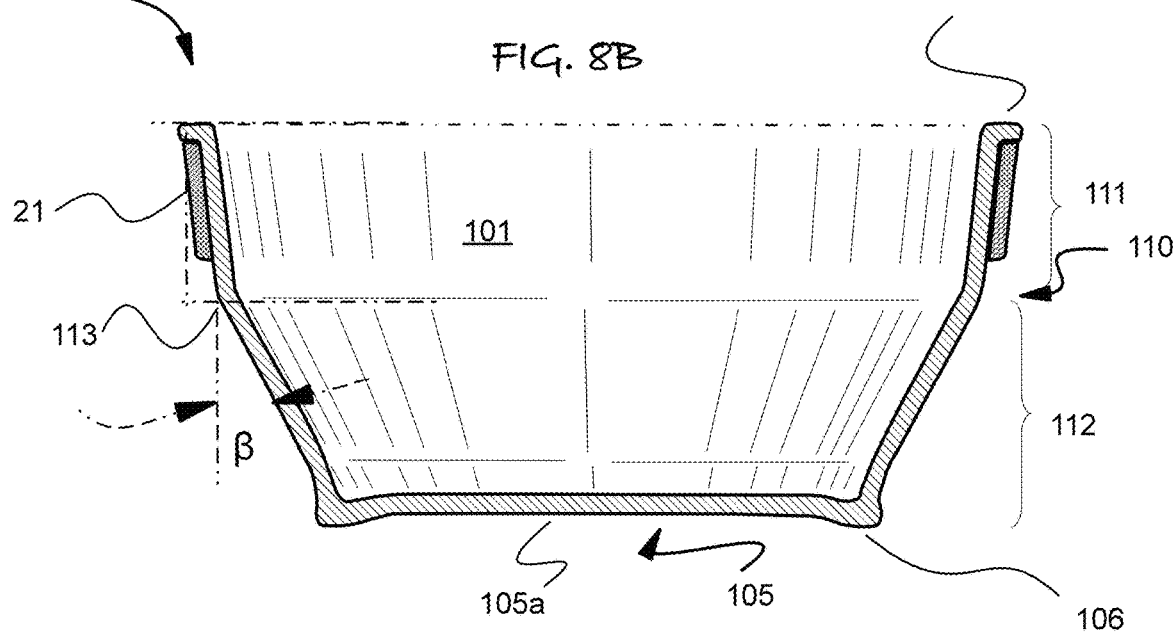

COOKWARE FOR USE IN A MICROWAVE OVEN

CROSS REFERENCE TO RELATED APPLICATIONS

This application claims priority to U.S. Provisional Patent Application No. 63/118,338 filed Nov. 25, 2020, the entirety of which is incorporated herein by reference.

TECHNICAL FIELD

This disclosure relates generally to cookware, and more specifically to cookware for use in a microwave oven.

BACKGROUND

A microwave oven (otherwise referred to as a microwave) may be used to quickly heat food items. However, traditional cookware for use in a microwave oven may be deficient.

SUMMARY

According to a first example, an article of cookware includes a substantially horizontal bottom having an interior surface and an opposing exterior surface, and a sidewall extending upward from the bottom to terminate at a rim. The bottom, the sidewall, and the rim define an interior volume for one or more food items. The sidewall has an inverted frustoconical shape with an upper portion, and a lower portion positioned below the upper portion. The upper portion has an outward tilt of less than about 10 degrees from a vertical line. The lower portion has an outward tilt that is at least about 15 degrees greater than the outward tilt of the upper portion.

Another example is any such article of cookware, where the article of cookware does not include any handles that extend beyond an outer perimeter of the rim.

Another example is any such article of cookware, where the sidewall has an exterior facing surface that is textured.

Another example is any such article of cookware, where the upper portion has a height of at least about 1 inch. Another example is any such article of cookware, where the lower portion has a height of at least about 2 inches. Another example is any such article of cookware, where the upper portion has a height that is at least about 20% larger than a height of the lower portion.

Another example is any such article of cookware, where the exterior surface of the bottom has an upward extending recess spaced away from a lower rim that forms a perimeter of the exterior surface.

Another example is any such article of cookware, further including a lid configured to extend across the rim, where the lid includes a gasket configured to seal the interior volume to prevent fluid leakage.

Another example is any such article of cookware, further including a lid configured to extend across the rim, where the lid is substantially flat and has a central recess that extends below the rim when the lid is positioned on the rim.

Another example is any such article of cookware, where the central recess includes a lid handle, the lid handle having an upper surface that extends above an upper surface of the lid by no more than a depth of a recess between a lower rim and a central portion of the exterior surface of the bottom.

Another example is any such article of cookware, where the lid handle is generally rectangular and narrower in width than half of a radius of an oval or circular recess in the lid.

Another example is any such article of cookware, where the lid has at least one sealable aperture for creating and/or releasing a vacuum within the cookware article when a gasket of the lid seals the interior volume.

According to a second example, a lid for sealable engagement of an article of cookware, includes a generally planar surface, a central recess positioned inward of the generally planar surface, and at least one sealable aperture positioned in the central recess for creating and/or releasing a vacuum within the container when a gasket of the lid seals an interior volume within the article of cookware.

Another example is any such lid, where the central recess is configured to extend below a rim of the article of cookware. Another example is any such lid, where the central recess contains a handle, and the handle is generally rectangular and narrower in width than half of a radius of the central recess. Another example is any such lid, where the central recess has an oval shape, a circle shape, or a curvilinear shape.

According to a third example, an article of cookware includes a substantially horizontal bottom having an interior surface and an opposing exterior surface, a sidewall extending upward from the bottom to terminate at a rim, and one or more handles or a laterally extending flange. The bottom, the sidewall, and the rim define an interior volume for one or more food items. The sidewall has an inverted frustoconical shape with an upper portion, and a lower portion positioned below the upper portion. The upper portion has an outward tilt of less than about 10 degrees from a vertical direction. The lower portion has an outward tilt that is at least about 15 degrees greater than the outward tilt of the upper portion.

Another example is any such article of cookware, further comprising a pad that is positioned about a circumference of the upper portion of the sidewall, and that is further positioned below the one or more handles or the laterally extending flange. Another example is any such article of cookware, where the pad is more thermally insulating than the sidewall of the cookware article. Another example is any such article of cookware, where the pad extends downward to at least beyond a transition between the upper portion and the lower portion of the sidewall.

According to a fourth example, an article of cookware includes a bottom, a sidewall extending upward from the bottom to terminate at a rim, and a thermally insulating pad that is positioned about a circumference of the sidewall. The bottom, the sidewall, and the rim define an interior volume for one or more food items. The sidewall has an inverted frustoconical shape with an upper portion, and a lower portion positioned below the upper portion. The upper portion has an outward tilt of less than about 10 degrees from a vertical line. The lower portion has an outward tilt that is at least about 15 degrees greater than the outward tilt of the upper portion.

Another example is any such article of cookware, where the thermally insulating pad covers an area of the sidewall that extends above and below a transition in-between the upper portion and the lower portion of the sidewall. Another example is any such article of cookware, where the thermally insulating pad conforms to the outward tilt of the upper portion of the sidewall, and further conforms to the outward tilt of the lower portion of the sidewall. Another example is any such article of cookware, where the thermally insulating pad is configured to deform under pressure of a user's hands to the outward tilt of the upper portion of the sidewall, and is further configured to deform under the pressure of the user's hands to the outward tilt of the lower portion of the sidewall.

According to a fifth example, a cookware body for microwave oven cooking has an external shape to facilitate gripping and transport without the need for handles that extend away from the cookware body side. A lower section of the cookware body has an inverted frustoconical shaped exterior wall with a relatively steep angle at the lower portion of the wall that is proximal to the bottom, as compared with an upper portion of the wall proximal to the rim. The cookware body can be picked up about the sides by placing insulating pads, such as pads or potholders, between the user's palms and the external walls, without exerting a significant amount of pressure, as the external shape of the upper portion and the lower portion exterior wall conforms to the shape provided by each hand when the fingers extend laterally about cookware body exterior wall. The exterior wall may have a textured surface to increase the friction with various types of potholders, such as silicone grips.

BRIEF DESCRIPTION OF THE FIGURES

For a more complete understanding of the present disclosure and one or more examples of the features and advantages of the present disclosure, reference is now made to the following description, taken in conjunction with the accompanying drawings, in which:

FIG. 5A is a schematic cross-sectional elevation view that illustrates another example of an article of cookware, where the article of cookware includes a lid.

FIG. 5B is a schematic cross-sectional elevation view of the lid of FIG. 5A in isolation.

FIG. 5C is an expanded view of an indicated portion from FIG. 5A.

FIGS. 8A and 8B are orthogonal schematic cross-sectional elevation views of another example of an article of cookware, taken along section line A-A and B-B, respectively, in FIG. 9.

DETAILED DESCRIPTION

Figure 1A:
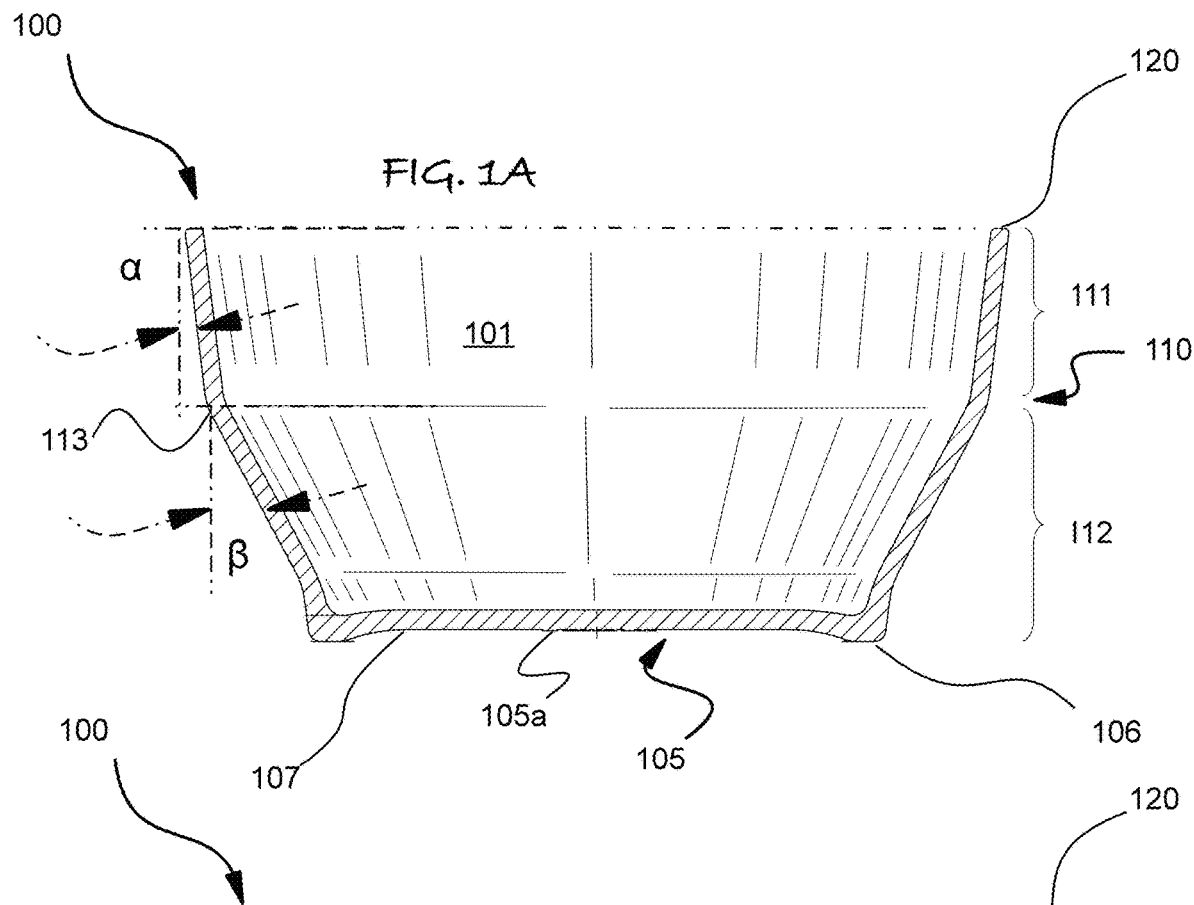
FIG. 1A is a schematic cross-sectional elevation view that illustrates one example of an article of cookware.

Examples of the present disclosure are best understood by referring to FIGS. 1A-12 of the drawings, like numerals being used for like and corresponding parts of the various drawings.

As is discussed above, a microwave oven may be used to quickly heat food items. However, traditional cookware for use in a microwave oven may be deficient. For example, traditional cookware may become very hot when used in the microwave due the heat transfer from the food items to the walls of the cookware. As such, the cookware may need to be removed from the microwave with care so as to prevent burns. In an attempt to prevent this, some traditional cookware may include utilize handles or lids with thick thermal insulation. This may only work, however, if the lid is secured in place. Furthermore, use of handles in the cookware tends to increase the width of the cookware, which can decrease the ability to store the cookware (e.g., they may no longer properly stack, and they may take up too much room in the refrigerator or freezer).

In contrast, the article of cookware 100 of FIGS. 1A-12 may address one or more of these deficiencies. For example, the article of cookware 100 may not have any handles, or may have smaller handles that are easier to grasp and transport when they become hot. As another example, the article of cookware 100 may be convenient to stack with other articles of cookware 100, which may increase the ability to store the articles of cookware 100. As a further example, the article of cookware 100 may be translucent, so as to allow a user to view the cooking process. As a further example, the article of cookware 100 may retain steam generated in the cooking process, thereby providing superior cooking results. As another example, the article of cookware 100 may enable the storage of food item(s) under at least a partial vacuum. This may increase storage time and may separate sources of aromas when used for storing different types of food items.

FIGS. 1A-12 illustrate examples of an article of cookware 100. The article of cookware 100 refers to cookware, container, or other structure that may receive and hold one or more food items (e.g., solid foods, liquids, fluids, etc.). The article of cookware 100 may be used to cook (or otherwise heat) a food item (e.g., in the microwave oven, in an oven, on a stovetop), cool a food item (e.g., in the refrigerator), store a food item (e.g., in the freezer, in the refrigerator, in a cabinet), or any combination of the preceding.

As is illustrated in FIGS. 1A-10A, the article of cookware 100 includes a bottom 105, and a sidewall 110 (or sidewalls 110) that surround the bottom 105 and are coupled to the bottom 105. The sidewall 110 extends in a generally vertical direction to a rim 120 that forms an upper opening to the article of cookware 100. The bottom 105, sidewall 110, and rim 120 define an interior volume 101 for holding the food item(s). The sidewall 110 includes a lower portion 112 positioned adjacent the bottom 105, and further includes an upper portion 111 positioned above the lower portion 112 in a location in-between the lower portion 112 and the rim 120. The article of cookware 100 may optionally include a lid 200, examples of which are described below. When the lid 200 in not positioned on the article of cookware 100, the article of cookware 100 may be nested within other articles of cookware 100 for storage.

The article of cookware 100 may also optionally include one or more handles. The handles may provide a user with an alternative means for gripping and transporting the article of cookware 100. In some examples, the article of cookware 100 does not include any handles. In other examples, the article of cookware 100 does include handles, but none of the handles extend laterally beyond the rim 120 of the article of cookware 100. This may allow the article of cookware 100 to be positioned closer to other items (e.g., other articles of cookware 100) for storage (e.g., in cabinets, in a refrigerator or other appliance), for shipping, and/or during cooking.

The article of cookware 100 may have any shape and/or size. Also, the sidewall 110 may extend straight upward (i.e., at a 90 degree angle to the bottom 105), may slope upward (e.g., at a 70 degree angle to the bottom 105), and/or may curve upward. Further examples of the shape of the article of cookware 100 and the sidewall 110 are described below. The article of cookware 100 (and/or is components) may be made of any material that can be used to hold a food item, such as glass, plastic, silicone, glass ceramic, any other material that can be used to hold a food item, or any combination of the preceding. In some examples, the article of cookware 100 (and/or is components) may be optionally substantially formed of a dielectric material, such as glass, plastic, silicone, and glass ceramic. In some examples, the lid 200 may have a perimeter band of metal (e.g., with no sharp corners) which is suitable for microwave oven cooking.

The sidewall 110 includes an exterior surface that is smooth or textured. In preferable examples, the exterior surface is textured. In some examples, at least the sidewall 110 of the article of cookware 110 is made of a transparent glass having a textured exterior surface that may provide for a translucent sidewall. The transparent glass having a textured exterior surface may provide various advantages. For example, if the exterior surface of the sidewall 110 is wet, the film of water on the exterior surface may reduce the light scattering attributes of the textured surface. In such an example, this may cause the wet portions to become translucent, allowing the user to see the food item(s) within the sidewall 110. This may warn the user of the wet exterior surface (which is traditionally slippery and difficult to grasp), in some examples. It may also make it easier for users to confirm that the article of cookware 100 is dry after washing.

The sidewall 110 (and the upper 111 and lower 112 portions of the sidewall 110) may have an inverted frustoconical shape, as is illustrated. In such an example, the upper portion 111 has an outward tilt α that is less than about 10 degrees (e.g., 10 degrees +/−20 percent) from a vertical line (which is orthogonal to the bottom 105). Furthermore, in such an example, the lower portion 112 has an outward tilt β that is at least about 15 degrees (e.g., 15 degrees +/−20 percent) greater than the outward tilt α of the upper portion 111, also measured from the vertical line (or another parallel vertical line). The vertical line(s) may be parallel to the vertical axis of the article of cookware 100. The sidewall 100 may include a transition 113 (e.g., a transition region or barrier 113) in-between the upper portion 111 and the lower portion 112. The transition 113 preferably has a continuous change in curvature that matches the shape of the surrounding upper portion 111 and lower portion 112, in some examples.

Figure 1B:
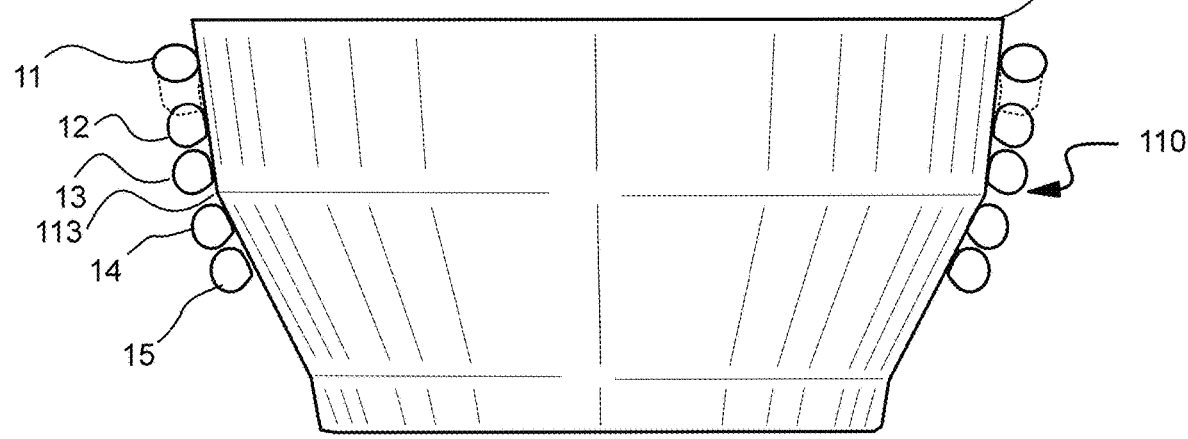
FIG. 1B is an external elevation view of the article of cookware of FIG. 1A being held by a user's hands.
Figure 2:
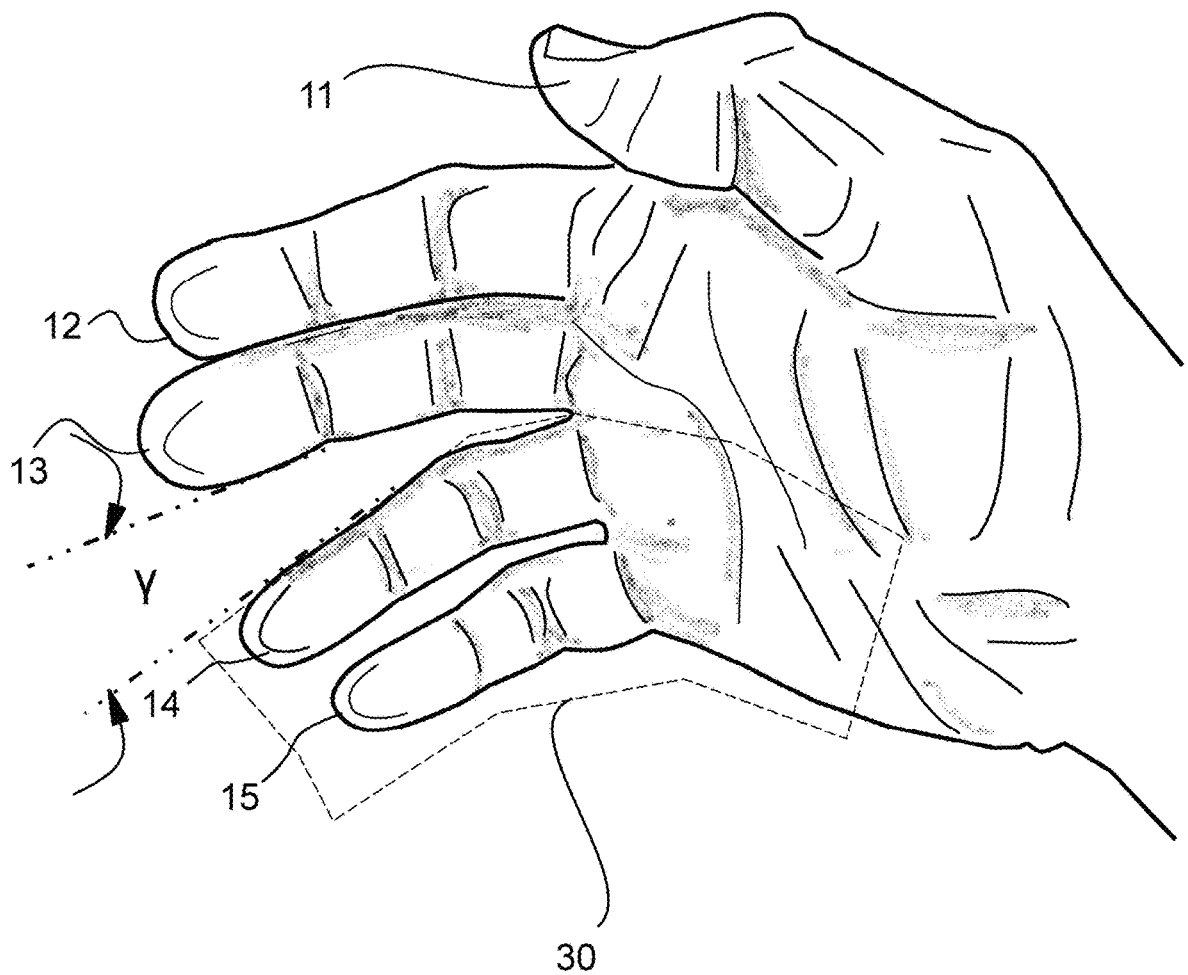
FIG. 2 is an isolated perspective view of the user's hands of FIG. 1B.
Figure 3A:
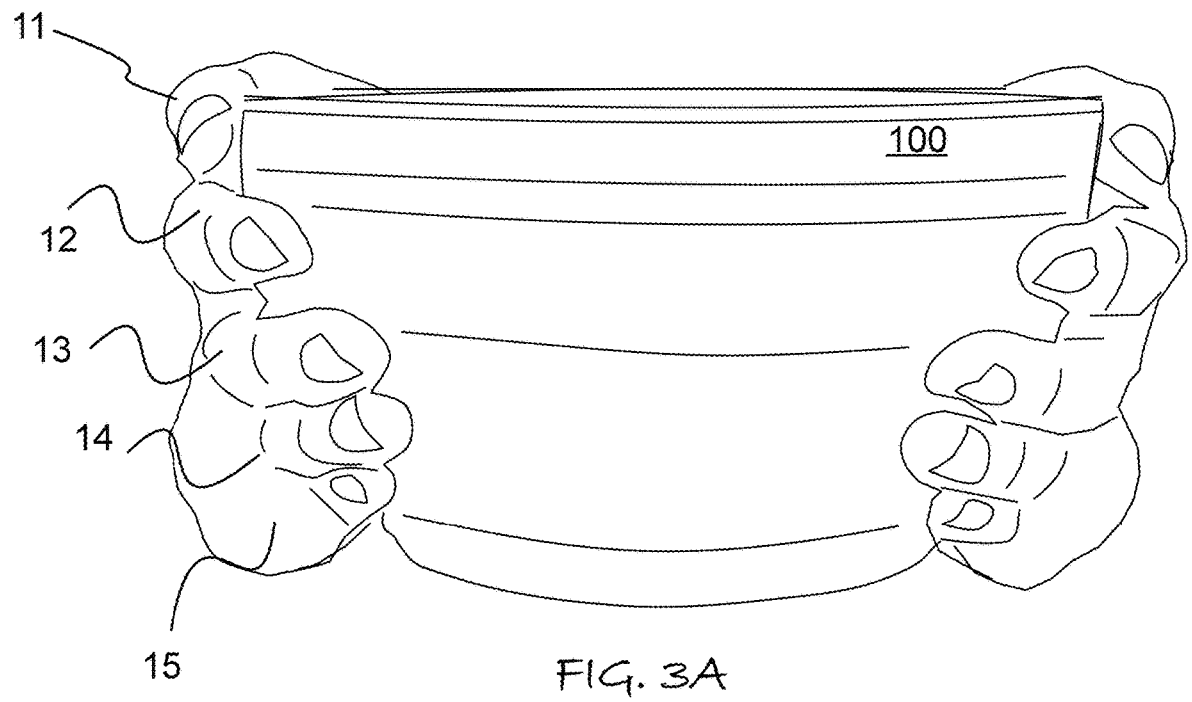
FIG. 3A is a schematic perspective front view that illustrates another example of an article of cookware, and further illustrates how a user may grip the article of cookware.
Figure 3B:
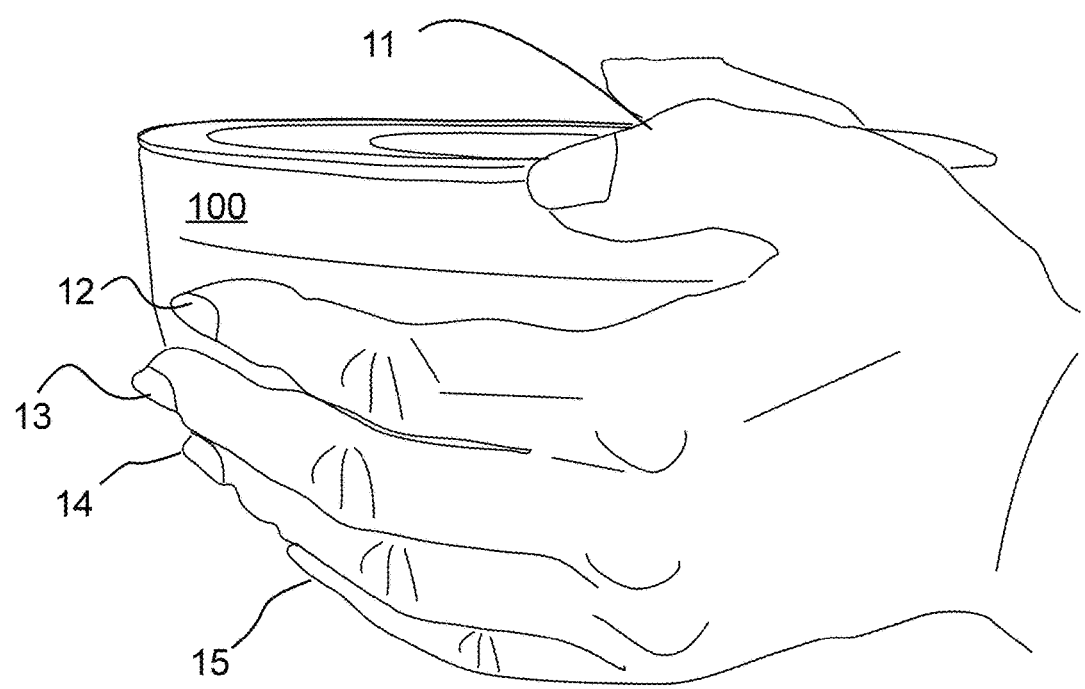
FIG. 3B is a side perspective view of the hand placement in FIG. 3A.
Figure 4A:
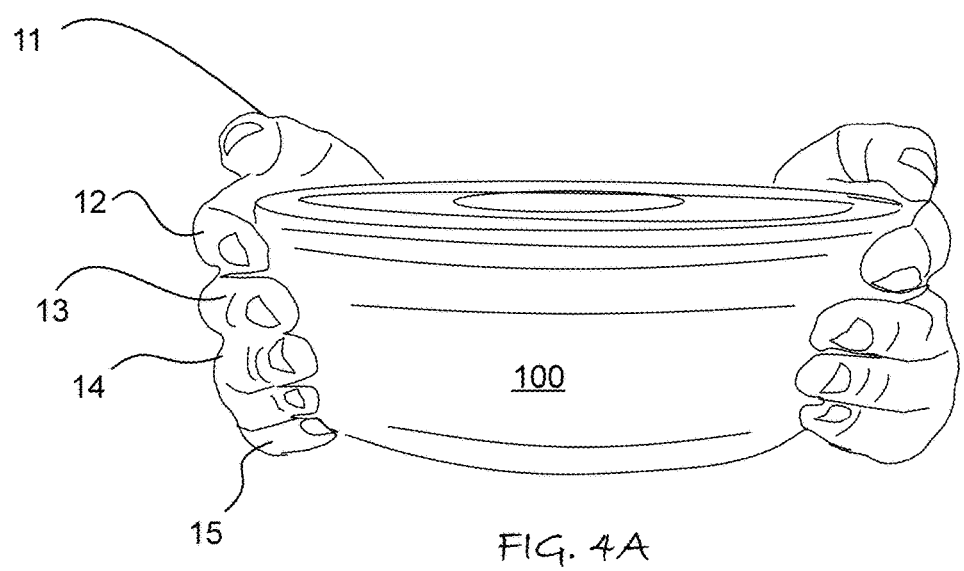
FIG. 4A is a schematic perspective front view that illustrates another example of an article of cookware, and further illustrates how a user may grip the article of cookware.
Figure 4B:
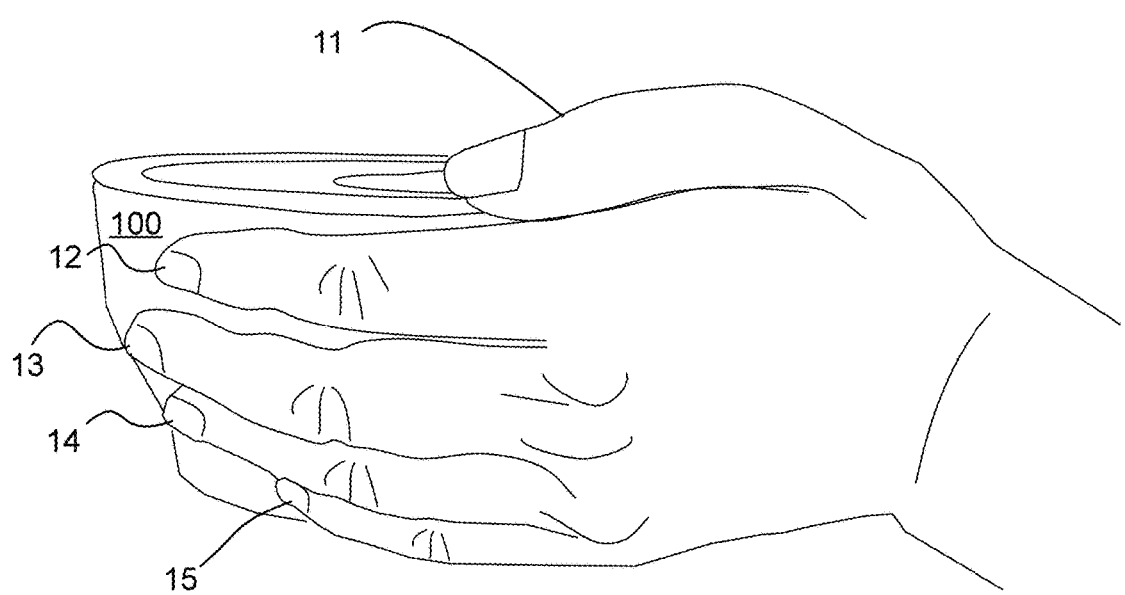
FIG. 4B is a side perspective view of the hand placement in FIG. 4A.

As is discussed above, the lower portion 112 may have an outward tilt β that is at least about 15 degrees greater than the outward tilt α of the upper portion 111. Example benefits of this difference in outward tilt angle are illustrated in FIGS. 1B, 2 and 3A, which show examples of the position of a user 10's fingers as they grip the article of cookware 10 on opposite areas of the sidewall 110.

As is seen, it may be convenient for users 10 to wrap their index finger 12 and middle finger 13 around the upper portion 111, while the ring finger 14 and pinkie 15 both may wrap around the lower portion 112. FIG. 2 shows a user 10's hand in perspective view to illustrate that when the user 10 flexes the joints of the middle finger 14 and pinkie 15, there is an angular separation Y between the ring finger 14 and the middle finger 13. It has been discovered that when this separation is greater than 20 degrees, the user 10 is able to comfortably apply bilateral force from opposing hands that spreads the gripping force over the four fingers 12, 13, 14, and 15, in some examples. In some examples, an even more effective grip is formed when Y is least 20 degrees and less than about 40 degrees. In such examples, the shape of the palm, in region 30 (illustrated in FIG. 2), more naturally conforms to the shape of the sidewall 110 about the transition 113 between the upper portion 111 and the lower portion 112.

As is also discussed above, the upper portion 111 may have an outward tilt α that is less than about 10 degrees (e.g., 10 degrees +/−20 percent). This may better position fingers 14 and 15 on the lower portion 112 to minimize the need to apply strong gripping pressure, in some examples.

In some preferable examples, each of the upper portion 111 and the lower portion 112 of the sidewall 100 have a height of at least about 1 inch (e.g., 1 inches +/−20 percent). This may provide space for the index finger 12 and middle finger 13 to wrap around the upper portion 111. In other preferable examples, the lower portion 112 has a height of at least about 2 inches to allow two or more fingers of each hand to wrap around it. In some examples, the upper portion has a height that is at least about 20% larger than a height of the lower portion.

FIGS. 3A-4B illustrate alternative positions of the user 10's fingers for gripping examples of the article of cookware 10. In particular, FIGS. 3A-4B show alternative placements of the thumbs 11. In FIGS. 3A and 3B, the end of the thumb 11 is positioned below the rim 120, and the proximal portion of the thumb 11 (i.e., the portion that is more proximal to the palm) is positioned at the corner of the rim 120 and the sidewall 110. Alternatively, in FIGS. 4A and 4B, the entire thumb 11 is positioned above the rim 120, while the index finger 12 wraps around the upper portion 111 of the sidewall 110 in a location just below the rim 120.

FIGS. 5A-5C illustrate another example of an article of cookware 100. In the example illustrated in FIG. 5A, the article of cookware 100 includes a pad 21 positioned on the sidewall 110. The pad 21 may be fabricated to conform to the upper portion 111 and lower portion 112 of the sidewall 110 above and below the transition 113, or the pad 21 may be pliable to deform under the pressure of the user 10's hands to deform to the shape of the sidewall 110. In some examples, the pad 21 is preferably a thermal insulation pad that is made of thermally insulating materials, such as silicone rubber, polymeric or rubber that is solid, porous or foamed, cork, woven and non-woven fabrics and fibers, composites thereof and the like, including materials conventionally used in pot holders, any other thermally insulating material(s), or any combination of the preceding. The thermal insulating pad is more thermally insulating than the sidewall 110 of the cookware article 100, in some examples.

In some examples, the thermal insulating pad 21 may be relatively thin due to the shape of the article of cookware 100 (as is discussed above). This shape may prevent the user from having to apply significant pressure to the article of cookware 100 in order to pick it up. This reduction of gripping pressure may reduce heat flow from the sidewall 100 to the thermal insulating pad 21, and thus to the user 10's hands.

The pad 21 may separable from the article of cookware 100, or it may be integrated with or permanently attached to the article of cookware 100. In some examples, the article of cookware 100 may include a handle (e.g., the handle 21 illustrated in FIG. 8A) or a flange-like lateral extension of the rim 120 (e.g., the flange-like lateral extension illustrated in FIG. 8B), which can provide a stopper that allows the pad 21 to be more easily affixed (e.g., by a user, by a manufacturer) to the article of cookware 100.

In the example illustrated in FIG. 5A, the article of cookware 100 includes a lid 200. The lid 200 is configured to be positioned on the article of cookware 100 so to extend across the rim 120 of the article of cookware 100. In some examples, the lid 200 preferably includes a gasket 121 (illustrated in FIGS. 6A-6B) that surrounds all or a portion of the perimeter of the lid 200, and that is configured to seal the interior volume 101 of the article of cookware 100 to prevent fluid leakage out of the article of cookware 100.

In some examples, the lid 200 is preferably substantially flat in an annular region 210 that surrounds a central recess 220. The recess 220 extends below the rim 120 of the article of cookware 100 when the lid 200 is positioned on the article of cookware 100 (in a manner that seals the inner volume 101). The central recess 220 may include a lid handle 230 that is configured to operate as a vacuum release valve and/or to lift the lid 200 (and also optionally lift the article of cookware 100 when the vacuum holds the lid 200 in place).

In some examples, the lid 200 preferably includes at least one sealable aperture for creating a vacuum within the article of cookware 100 and/or for releasing the vacuum (when, for example, the gasket 121 of the lid 200 seals the interior volume of the article of cookware 100). The lid handle 230 may provide an actuator for a valve to open and seal the aperture in the lid.

Figure 6A:
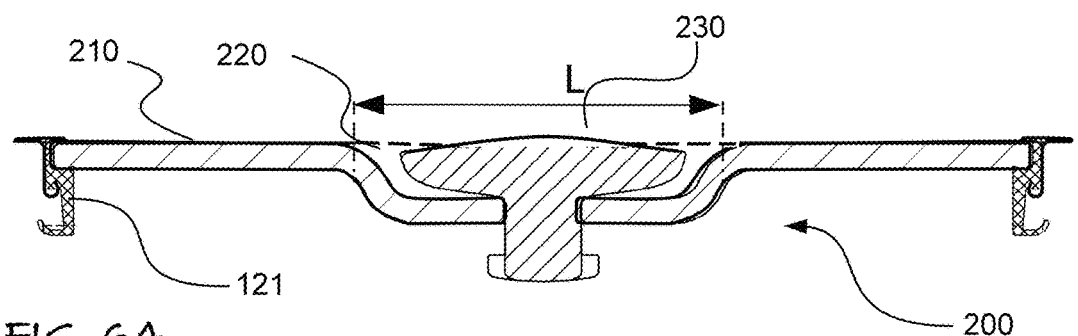
FIG. 6A is a schematic cross-sectional elevation view of one example of a lid for an article of cookware, taken along section line a-a of FIG. 6B.
Figure 6B:
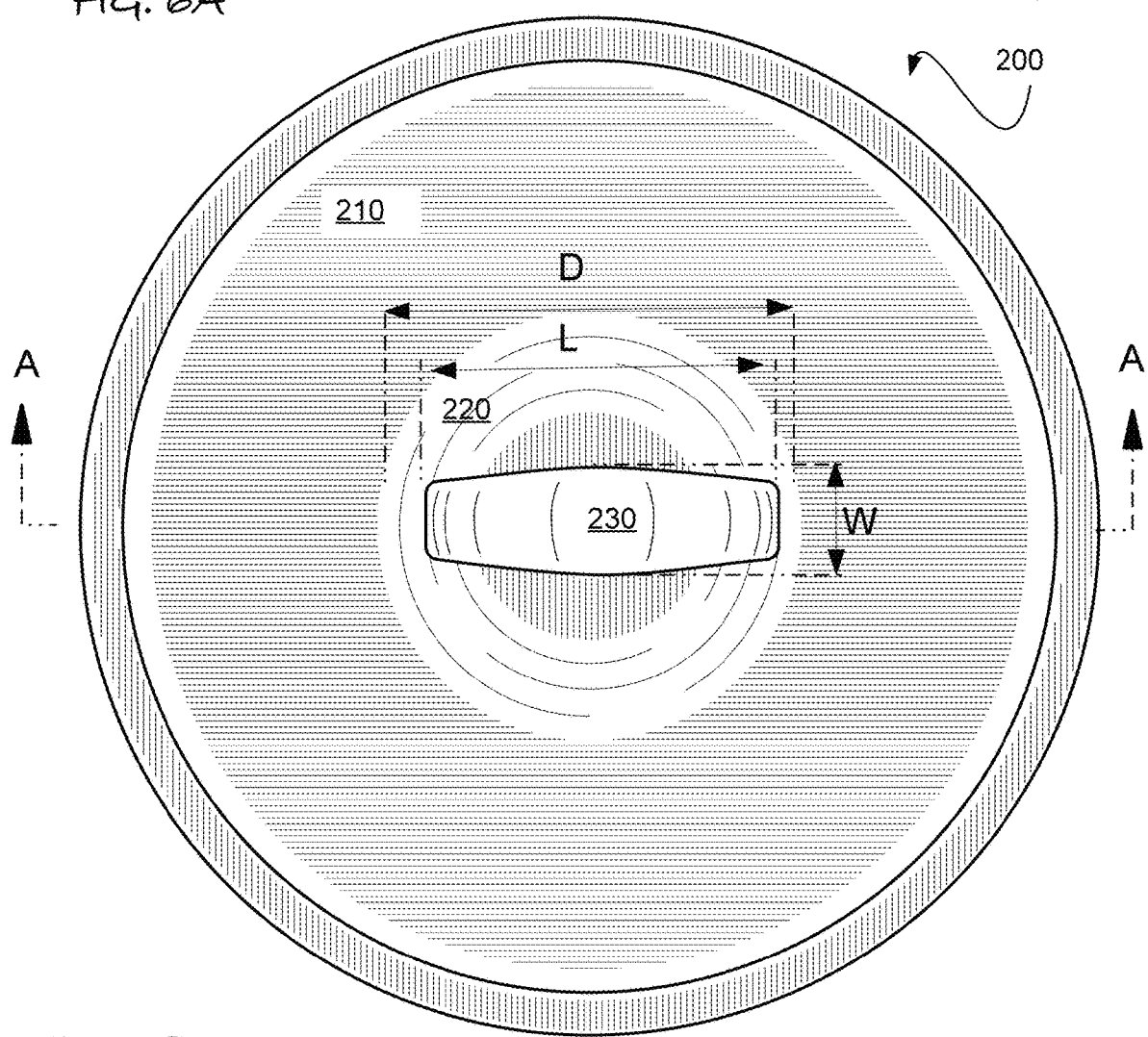
FIG. 6B is a top plan view of the lid of FIG. 6A indicating the section line a-a that corresponds to FIG. 6A.

In some examples, the lid handle 230 is preferably shaped to fit within the central recess 220 in manner that leaves sufficient space for a user 10 to grip the lid handle 230 by placing fingers on the underside of the lid handle 230, but without touching the exterior surface of the central recess 220 (which may be very warm). FIGS. 6A and 6B illustrate preferred examples of the shape of the lid handle 230. As is illustrated, the lid handle 230 has a generally rectangular shape with a width W and a length L, both of which are less than the diameter D of the recess 220. The regions between the recess 220 and the lid handle 230 (e.g., the wide side of the lid handle 230) provide a space for the user to lower and insert fingers between an underside of the lid handle 230 and the upper surface of the recess 220 (and/or the lid 200).

The recess 220 of the lid 200 may have any shape. For example, the recess 220 may be shaped as an oval, a circle, any other curvilinear shape, or any combination of the preceding. In some examples, it is preferable for the handle to have a width W that is less than half the radius (D/2) of an oval or circular recess 220 in the lid 200.

Figure 9:
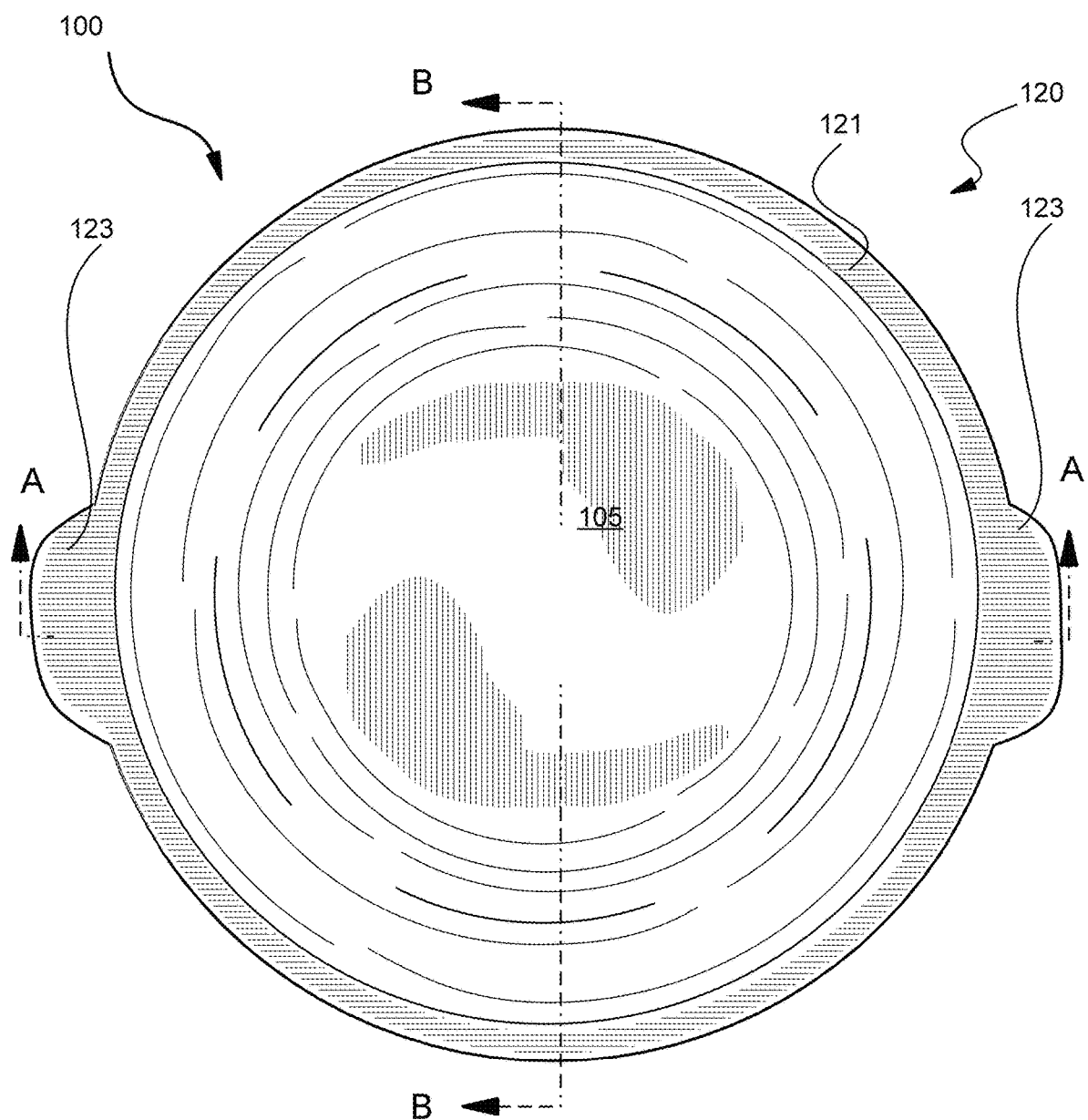
FIG. 9 is a top plan view of article of cookware of FIGS. 8A and 8B.
Figure 10:
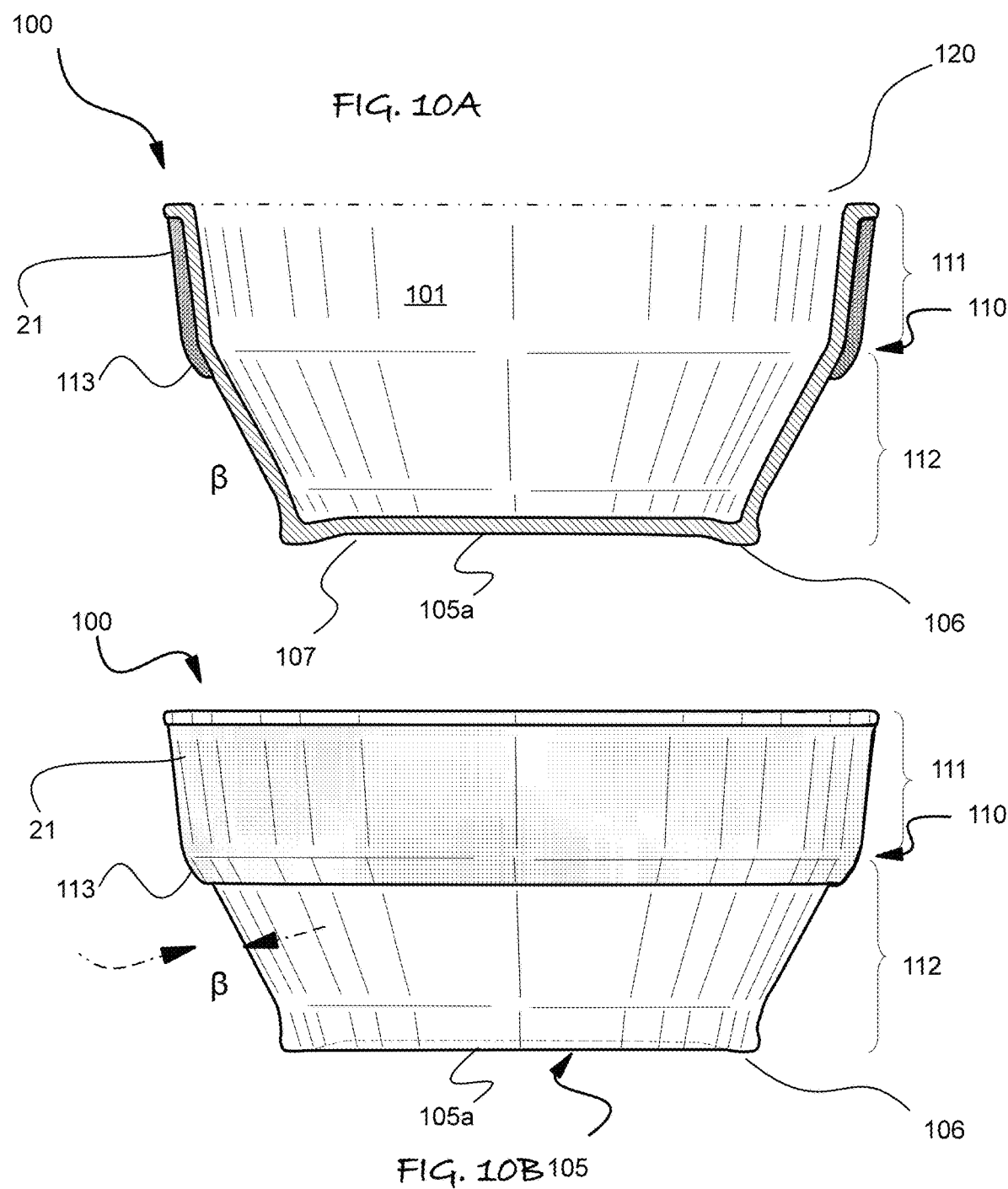
FIG. 10A is a schematic cross-sectional elevation view of another example of an article of cookware.
FIG. 10B is a side elevation view of the article of cookware of FIG. 10A.
Figure 11:
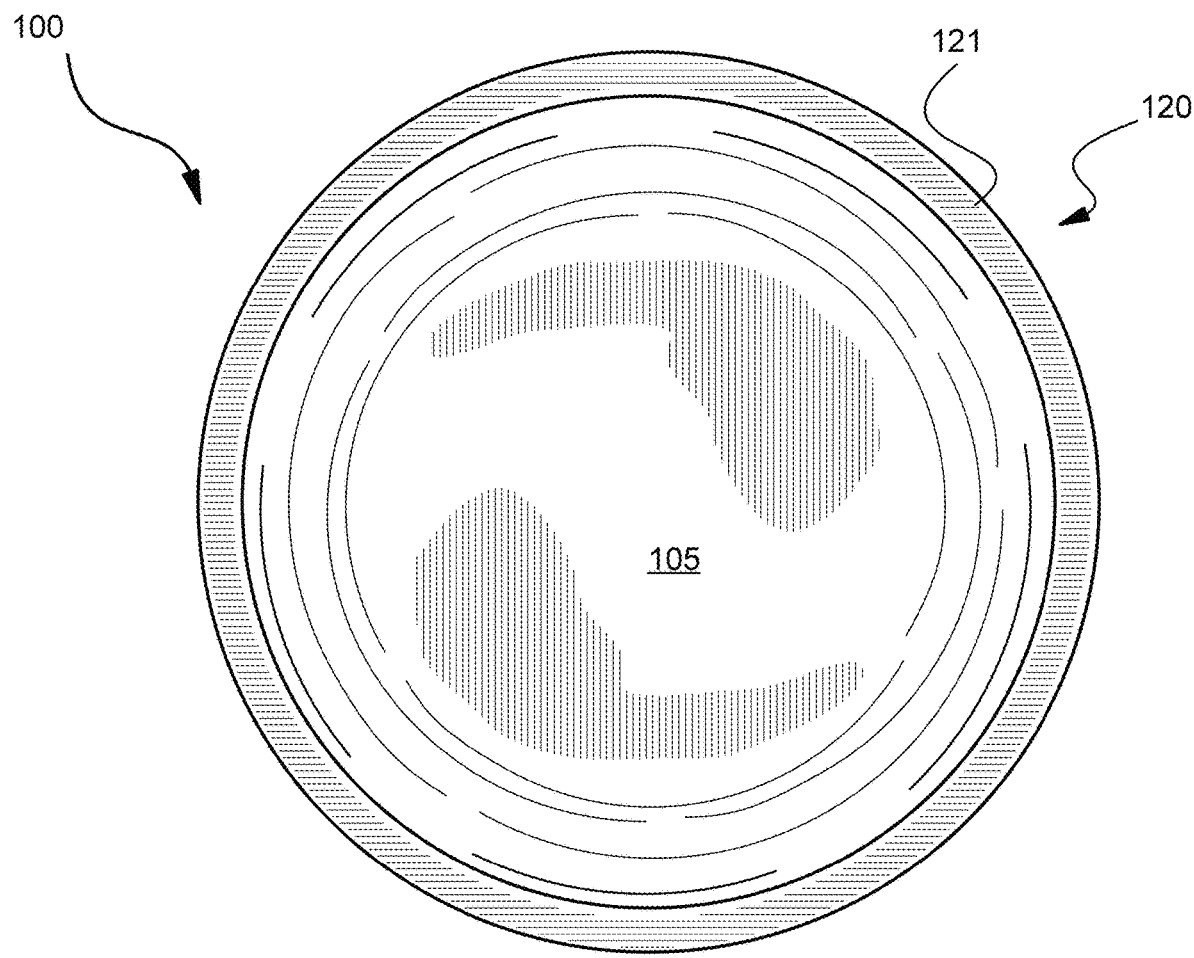
FIG. 11 is a top plan view of the article of cookware of FIG. 10A.
Figure 12:
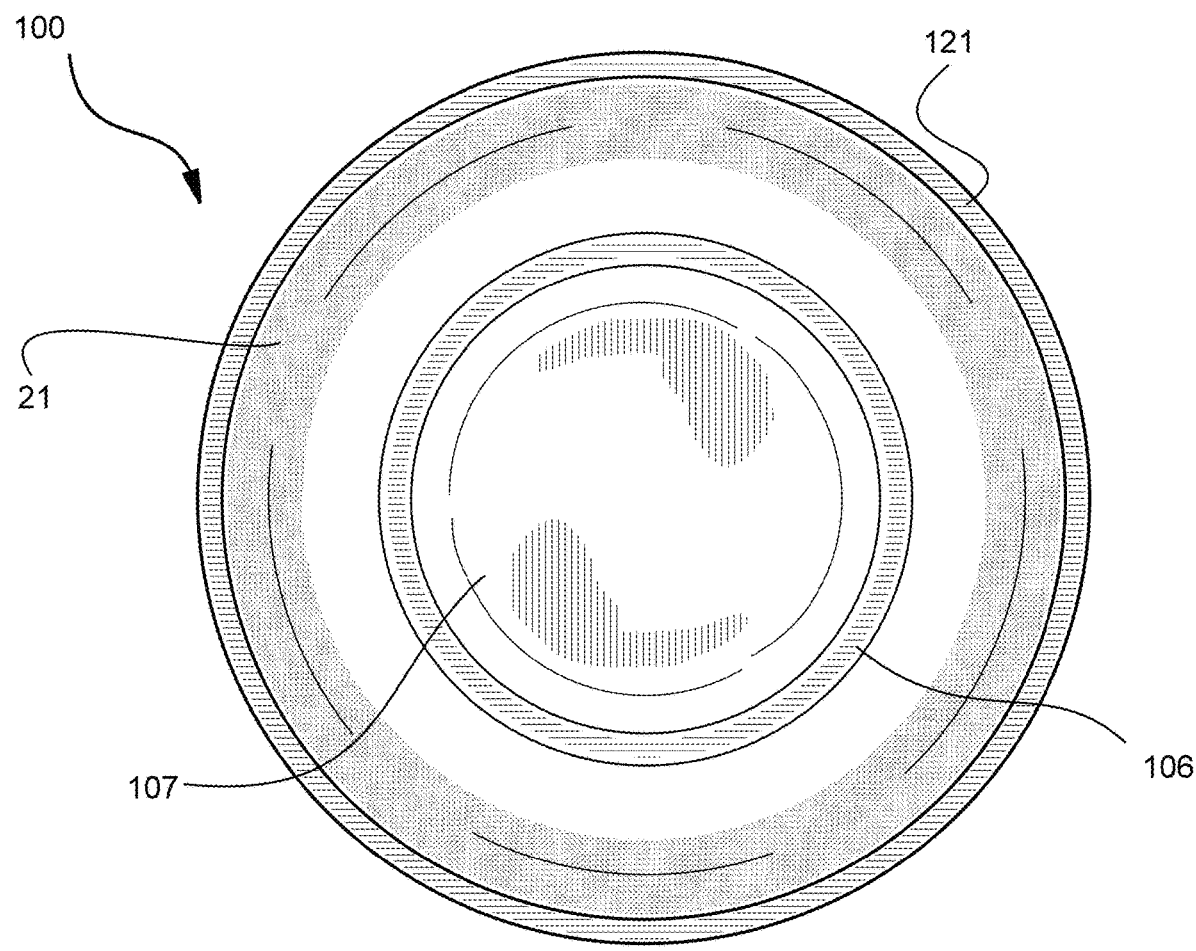
FIG. 12 is a bottom plan view of the article of cookware of FIG. 10A.

FIGS. 8A, 8B, and 9 illustrate additional examples of an article of cookware 100. In FIG. 8A, the article of cookware 100 includes a handle 123 that is integrated with the rim 120, or that extends outward from the rim 120. When integrated with the rim 120, the handle 123 may not extend laterally further than the rim 120. The handle 123 may include an upper surface and a lower surface, and the lower surface may restrict the movement of the pad 21 beyond the rim 120 when it is gripped by the user. The handle 123 may extend around all or a portion of the perimeter of the rim 120. By extending around the entire perimeter of the rim 120, the handle 123 may be in contact with the entire perimeter of the pad 21. In some examples, the pad 21 may laterally extend further out than the handle 123, as is illustrated in FIG. 8A as pad portion 21a. This may allow pad 21 to provide a thermal insulating layer of protection to the handle 123, which may prevent burns to the user.

In FIG. 8B, the article of cookware 100 includes a laterally extending flange 121 that is integrated with the rim 120, or that extends outward from the rim 120. The flange 121 may include an upper surface and a lower surface, and the lower surface may restrict the movement of the pad 21 beyond the rim 120 when it is gripped by the user. The flange 121 may extend around all or a portion of the perimeter of the rim 120. By extending around the entire perimeter of the rim 120, the flange 121 may be in contact with the entire perimeter of the pad 21.

Figure 7:
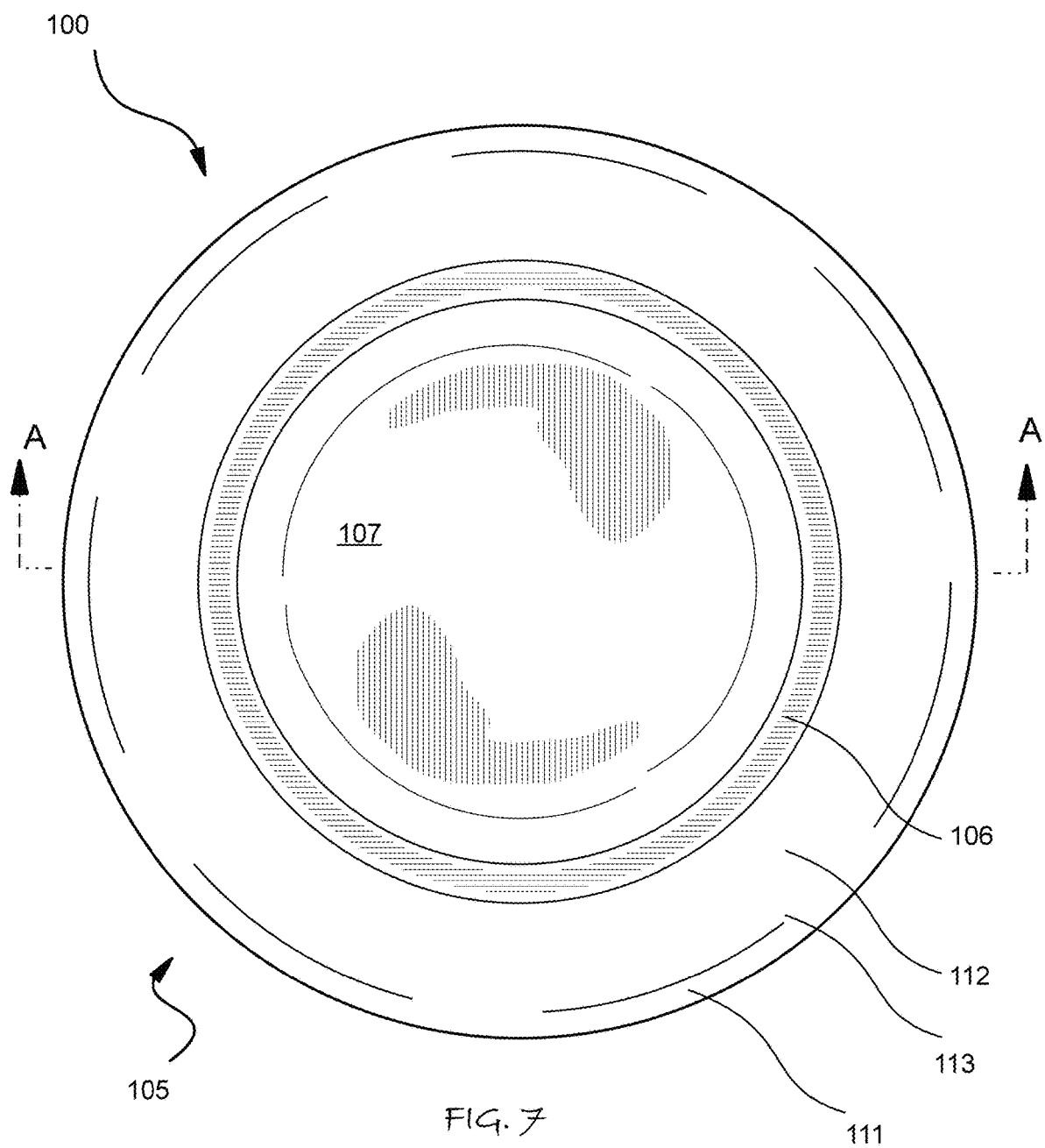
FIG. 7 is bottom plan view of one example of an article of cookware.

As is further illustrated in FIGS. 8A, 8B, and 9, the article of cookware 100 may include a bottom 105 having an exterior surface 105a. In some examples, the exterior surface 105a has an upward extending recess 107 that is spaced away from a lower rim 106 that forms the perimeter of the exterior surface 105a, as is illustrated in FIGS. 8A and 8B. The recess 107 may allow multiple articles of cookware 100 to be stably stacked by accommodating a lid 200 or lid handle 230 that protrudes above the rim 120. This allows the articles of cookware 100 to be stacked with the lids 200 in place (e.g., when they contain food). To assist with this, the lid handle 230 (within the central recess 220) preferably has an upper surface that extends vertically above an upper surface of the lid 200 by no more than the depth of the recess 107 between the lower rim 106 and the central portion of the exterior surface 105a of the bottom 105 of the article of cookware 100, in some examples. A bottom view of an bottom 105 is illustrated in FIG. 7.

FIGS. 10A-12 illustrate another example of an article of cookware 100. As is illustrated, the pad 21 is positioned on the sidewall 110 below the lateral flange 121. Furthermore, the pad 21 extends downward and circumferentially around the perimeter of the sidewall 110 towards the lower portion 112, so as to cover the transition 113.

Modifications, additions, and/or substitutions may be made to the articles of cookware 100 of any one or more of FIGS. 1A-12, the components of the articles of cookware 100 of any one or more of FIGS. 1A-12, and/or the functions of the articles of cookware 100 of any one or more of FIGS. 1A-12 without departing from the scope of the specification. Furthermore, one or more of the components illustrated in FIGS. 1A-12 may be added to or removed from any of the articles of cookware 100 illustrated in FIGS. 1A-12.

This specification has been written with reference to various non-limiting and non-exhaustive examples. However, it will be recognized by persons having ordinary skill in the art that various substitutions, modifications, or combinations of any of the disclosed examples (or portions thereof) may be made within the scope of this specification. Thus, it is contemplated and understood that this specification supports additional examples not expressly set forth in this specification. Such examples may be obtained, for example, by combining, modifying, or reorganizing any of the disclosed components, elements, features, aspects, characteristics, limitations, and the like, of the various non-limiting and non-exhaustive examples described in this specification.

What is claimed is:

1. An article of cookware, comprising:
   a) substantially horizontal bottom having an interior surface and an opposing exterior surface; and
   b) a sidewall extending upward from the bottom to terminate at a rim, wherein the bottom, the sidewall, and the rim define an interior volume for one or more food items;
   c) wherein the sidewall has an inverted frustoconical shape with an upper portion and a lower portion positioned below the upper portion, the upper portion having an outward tilt of less than about 10 degrees from a vertical line, the lower portion having an outward tilt that is at least about 15 degrees greater than the outward tilt of the upper portion.

2. The article of cookware according to claim 1, wherein the article of cookware does not include any handles that extend beyond an outer perimeter of the rim.

3. The article of cookware according to claim 1, wherein the sidewall has an exterior facing surface that is textured.

4. The article of cookware according to claim 1, wherein the upper portion has a height of at least about 1 inch.

5. The article of cookware according to claim 1, wherein the lower portion has a height of at least about 2 inches.

6. The article of cookware according to claim 1, wherein the upper portion has a height that is at least about 20% larger than a height of the lower portion.

7. The article of cookware according to claim 1, wherein the exterior surface of the bottom has an upward extending recess spaced away from a lower rim that forms a perimeter of the exterior surface.

8. The article of cookware according to claim 1, further comprising a lid configured to extend across the rim, wherein the lid includes a gasket configured to seal the interior volume to prevent fluid leakage.

9. The article of cookware according to claim 1, further comprising a lid configured to extend across the rim, wherein the lid is substantially flat and has a central recess that extends below the rim when the lid is positioned on the rim.

10. The article of cookware according to claim 9, wherein the central recess includes a lid handle, the lid handle having an upper surface that extends above an upper surface of the lid by no more than a depth of a recess between a lower rim and a central portion of the exterior surface of the bottom.

11. The article of cookware according to claim 10, wherein the lid handle is generally rectangular and narrower in width than half of a radius of an oval or circular recess in the lid.

12. The article of cookware according to claim 9, wherein the lid has at least one sealable aperture for one of creating and releasing a vacuum within the cookware article when a gasket of the lid seals the interior volume.

13. An article of cookware, comprising:
   a) a bottom;
   b) a sidewall extending upward from the bottom to terminate at a rim, wherein the bottom, the sidewall, and the rim define an interior volume for one or more food items, wherein the sidewall has an inverted frustoconical shape with an upper portion, and a lower portion positioned below the upper portion, the upper portion having an outward tilt of less than about 10 degrees from a vertical line, the lower portion having an outward tilt that is at least about 15 degrees greater than the outward tilt of the upper portion; and
   c) a thermally insulating pad that is positioned about a circumference of the sidewall.

14. The article of cookware according to claim 13, wherein the thermally insulating pad covers an area of the sidewall that extends above and below a transition in-between the upper portion and the lower portion of the sidewall.

15. The article of cookware according to claim 14, wherein the thermally insulating pad conforms to the outward tilt of the upper portion of the sidewall, and further conforms to the outward tilt of the lower portion of the sidewall.

16. The article of cookware according to claim 14, wherein the thermally insulating pad is configured to deform under pressure of a user's hands to the outward tilt of the upper portion of the sidewall, and is further configured to deform under the pressure of the user's hands to the outward tilt of the lower portion of the sidewall.

17. An article of cookware, comprising:
   a) a substantially horizontal bottom having an interior surface and an opposing exterior surface;
   b) a sidewall extending upward from the bottom to terminate at a rim, wherein the bottom, the sidewall, and the rim define an interior volume for one or more food items, wherein the sidewall has an inverted frustoconical shape with an upper portion and a lower portion positioned below the upper portion, the upper portion having an outward tilt of less than about 10 degrees from a vertical direction, the lower portion having an outward tilt that is at least about 15 degrees greater than the outward tilt of the upper portion; and
   c) one or more handles or a laterally extending flange.

18. The article of cookware according to claim 17, further comprising a pad that is positioned about a circumference of the upper portion of the sidewall, and that is further positioned below the one or more handles or the laterally extending flange.

19. The article of cookware according to claim 18, wherein the pad is more thermally insulating than the sidewall of the cookware article.

20. The article of cookware according to claim 18, wherein the pad extends downward to at least beyond a transition between the upper portion and the lower portion of the sidewall.

* * * * *